A. C. BRISACK.
AGRICULTURAL IMPLEMENT.
APPLICATION FILED MAR. 22, 1915.
1,194,942.
Patented Aug. 15, 1916.
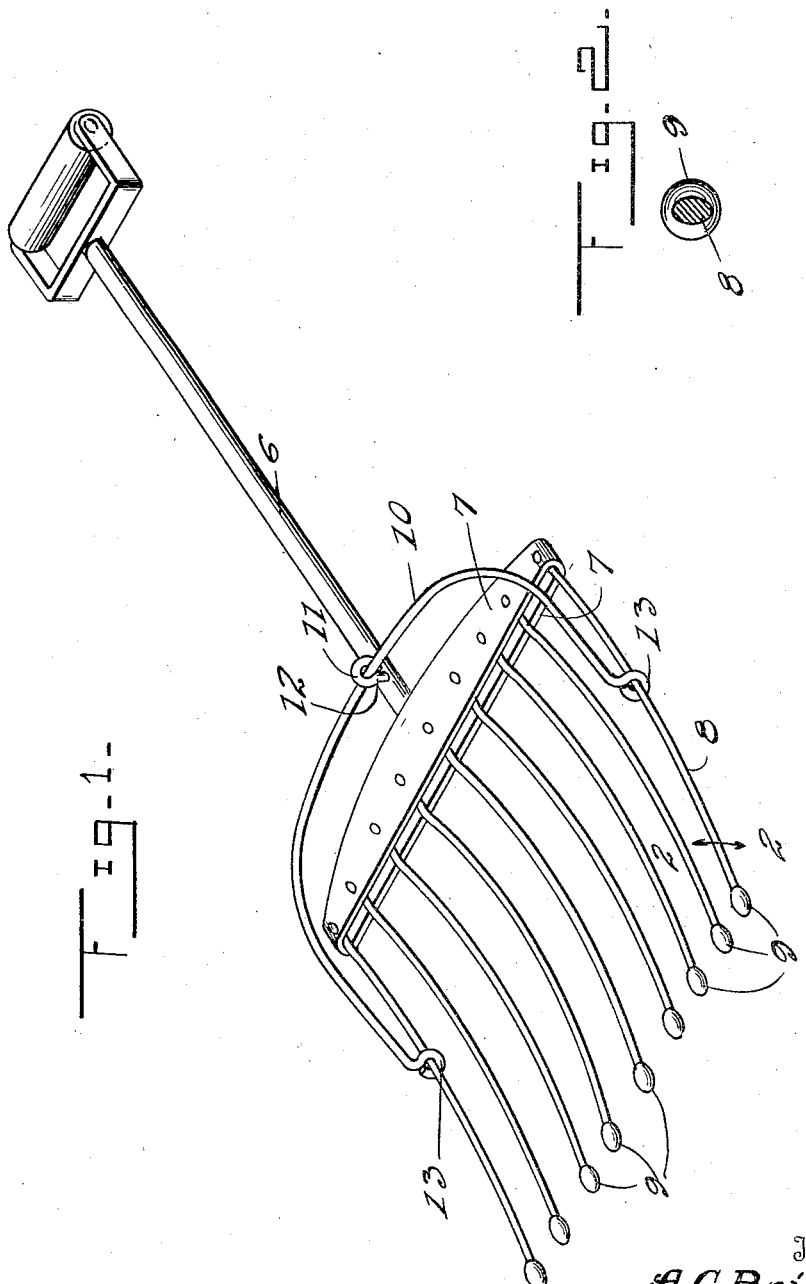
Inventor
A. C. Brisack, னi # UNITED STATES PATENT OFFICE.

ANNA C. BRISACK, OF HENSONVILLE, NEW YORK.

AGRICULTURAL IMPLEMENT.

1,194,942.   Specification of Letters Patent.   Patented Aug. 15, 1916.

Application filed March 22, 1915. Serial No. 16,132.

*To all whom it may concern:*

Be it known that I, ANNA C. BRISACK, a citizen of the United States, residing at Hensonville, in the county of Greene and State of New York, have invented certain new and useful Improvements in Agricultural Implements; and I do hereby declare the following to be a full, clear, and exact description of the invention, such as will enable others skilled in the art to which it appertains to make and use the same.

This invention relates to agricultural implements and has for its object to provide a hand implement of improved and efficient construction especially designed for digging or picking potatoes and similar vegetables of that character which grow beneath the surface of the ground.

Another object is the provision of an agricultural implement of improved construction by means of which potatoes and similar vegetables may be quickly and easily removed from the ground without danger of injury to the vegetables.

With these and other objects in view, the invention consists in the novel construction, arrangement and formation of parts as will be hereinafter specifically described, claimed and illustrated in the accompanying drawing, in which:

Figure 1 represents a perspective view of the improved agricultural implement. Fig. 2 represents a transverse sectional view on the line 2—2 of Fig. 1.

Referring to the drawing in detail, wherein similar reference numerals designate corresponding parts throughout the several views, the numeral 6 indicates the handle to one end of which are secured a pair of spaced plates 7 constituting a head between which the inner extremities of a plurality of tines 8 are rigidly secured.

The outer or free end of the tine 8 is formed with an oval or egg-shaped enlargement 9 designed to eliminate liability of injury to the potatoes or other vegetables when the implement is inserted beneath the plant. The tines are also preferably curved from end to end to eliminate tendency of the vegetables to roll therefrom when the implement is tilted.

A guard rail 10 of substantially U-shape is secured centrally in an eye or apertured head 11 of a shank 12, which latter is secured in the handle 6 adjacent the head or plates 7. The parallel portions of the U-shaped member or guard rail 10 are extended in spaced relation and substantially parallel to the end tines 8 and are secured adjacent the center of the latter by looping the ends 13 of the guard rail thereover.

What I claim is:

In an agricultural implement, a head formed of a pair of parallel spaced plates, a plurality of tines having their inner ends positioned between and secured to said head plates, a handle secured to said head, egg-shaped enlargements formed integrally with the free ends of said tines, an eye bolt secured to said handle, a substantially U-shaped guard rail having its bight portion extending through said eye bolt, the ends of said guard rail coiled about the outermost of said tines substantially equidistant of the ends of the tines.

In testimony whereof I affix my signature in presence of two witnesses.

ANNA C. BRISACK.

Witnesses:
  EDITH L. PEETS,
  IRENE A. WELLMAN.

Copies of this patent may be obtained for five cents each, by addressing the "Commissioner of Patents, Washington, D. C."